United States Patent
Hurd

[15] 3,684,327
[45] Aug. 15, 1972

[54] APPARATUS FOR CONVEYING ARTICLES ALONG A PNEUMATIC CHANNEL

[72] Inventor: Stanley E. Hurd, 851 Russet Dr., Sunnyvale, Calif. 94087

[22] Filed: Dec. 17, 1970

[21] Appl. No.: 99,224

[52] U.S. Cl. .................................. 302/2 R, 302/29
[51] Int. Cl. ........................................... B65g 53/04
[58] Field of Search............ 302/29, 31, 2 R; 221/278

[56] References Cited

UNITED STATES PATENTS

| | | | |
|---|---|---|---|
| 3,210,124 | 10/1965 | Niemi et al. | 302/2 R |
| 1,165,700 | 12/1915 | Muessel | 221/278 |
| 2,342,680 | 2/1944 | Melzer | 302/2 R |

*Primary Examiner*—Richard E. Aegerter
*Assistant Examiner*—Hadd S. Lane
*Attorney*—Patrick J. Walsh

[57] ABSTRACT

The conveyor includes a plurality of elongated guide rails disposed to form a channel for conveying articles. An elongated plate closes the open side of the channel and a plurality of slots are formed through the plate for directing air from a plenum on one side of the plate into the channel formed by the guide rails. The slots are configured to provide air jets having flow components predominantly parallel to the direction of movement of the articles to propel the articles along the channel. The sides of the channel are spaced one from the other a distance greater than the predetermined width of the articles being conveyed and less than a whole multiple thereof greater than one, whereby the articles are arranged in rows in the direction of movement with the articles in each row being spaced one from the other. Substantially the entirety of the propelling force normally applied to the articles is thus applied to the articles when accumulated whereby a rapid accumulation recovery rate is obtained.

4 Claims, 3 Drawing Figures

PATENTED AUG 15 1972  3,684,327

INVENTOR
STANLEY E. HURD

BY Patrick J Walsh

ATTORNEY

APPARATUS FOR CONVEYING ARTICLES ALONG A PNEUMATIC CHANNEL

The present invention relates to a materials handling apparatus and particularly relates to an air conveyor specifically configured in relation to the articles conveyed to obtain a rapid accumulation recovery rate.

In many types of conveyors, articles conveyed are stopped or their velocity is substantially retarded prior to discharge from the conveyor. That is to say, articles oftentimes accumulate along the conveyor. In mechanical type conveyors wherein the conveying surface normally frictionally engages the articles, a rapid accumulation recovery rate is generally obtained. In other words, articles on these types of conveyors may be stopped or their movement along the conveyor substantially retarded whereby the articles accumulate one behind the other, the articles being then continued in the direction of conveyance and obtaining their normal velocity along the conveyor practically instantaneously once released from accumulation. Thus, in many types of conveyors, the recovery rate of articles from accumulation is not a factor in the design of the conveyor.

In air conveyors, however, it is only after the lapse of a significant time interval that articles reacquire their normal velocity after release from accumulation. That is to say, in air conveying systems, the articles do not recover from accumulation and acquire normal conveying speeds as quickly as in other types of conveying systems or as quickly as may be desired or necessary. For example, in an air conveyor wherein articles are arranged along the conveyor in a single file one behind the other, a specified flow of air is required to propel the articles along the conveyor at a predetermined velocity. However, once the articles have been stopped or their movement significantly retarded, with the result that the articles tend to accumulate along the conveyor one directly behind the other, the specified flow of air does not have sufficient force to immediately accelerate the articles to their normal conveying velocity. Rather, the articles accelerate slowly and a significant time interval passes before such articles obtain their normal conveying velocity. This condition obtains when the articles are stacked one directly behind the other, i.e., accumulated, because the air jets cannot act effectively between the articles and hence against their edges and can act substantially only on areas of the articles having surfaces generally parallel to the flow direction of the air jets. Thus, the propelling force provided accumulated articles is reduced in comparison with the propelling force behind the articles when separated one from the other during normal conveyance along the conveyor. It will be appreciated that a reduction in recovery time from accumulation significantly affects conveyor operations particularly where high delivery rates from the conveyor are desired or necessary.

The present invention provides an air conveyor wherein the above discussed problems associated with prior conveyors are eliminated or minimized and particularly provides an air conveyor having an improved accumulation recovery rate wherein the full force of the propelling air jets act on the articles when recovering from accumulation. To this end, the air conveyor hereof comprises an elongated channel-shaped guide along which the articles are conveyed. A plate having a plurality of directional slots formed therethrough closes the open side of the channel-shaped guide and air is directed from a plenum through the directional slots into the channel-shaped guide and against the articles constrained therein. It is a particular feature of the present invention that the width of the articles and the width of the channel-shaped conveyor guide are related such that improved accumulation recovery rates are obtained. Particularly, the spacing between the sides of the conveyor guide is greater than the width of the articles conveyed and less than a whole multiple of the width of the articles greater than 1. In this manner, when the articles accumulate along the conveyor, they obtain positions laterally offset one from the other permitting the propelling force of the air jets to impinge against substantially the entirety of the rear edges of the accumulated articles.

The improved air conveyor hereof is particularly useful for conveying circular or disc-like articles, for example, jar lids. Specifically, the jar lids will accumulate in a manner to obtain positions forming a plurality of staggered rows thereof in the direction of conveyance. Accordingly, the propelling force of the air jets will act against substantially the entirety of the rear edges of the lids as the accumulation in staggered rows causes the lids in each row to be spaced one from the other in the direction of conveyance. Thus, the foregoing described specific relation of the width of the conveyor guide and the width of the articles conveyed, i.e., the diameter of the jar lids, results in rapid recovery of the articles from accumulation to their normal conveying velocity.

Accordingly, it is a primary object of the present invention to provide a materials handling conveyor with an improved accumulation recovery rate.

It is another object of the present invention to provide an air conveyor wherein its width is related to the size of the articles conveyed in a manner to obtain a rapid recovery of the articles from accumulation to their normal conveying velocity.

It is still another object of the present invention to provide an air conveyor with improved accumulation recovery rate wherein the propelling force of the air jets applied to the articles when accumulated is substantially the same as the propelling force applied thereto when conveyed at normal speeds.

These and further objects and advantages of the present invention will become more apparent upon reference to the following specification, claims, and appended drawings, wherein:

Figure 1:
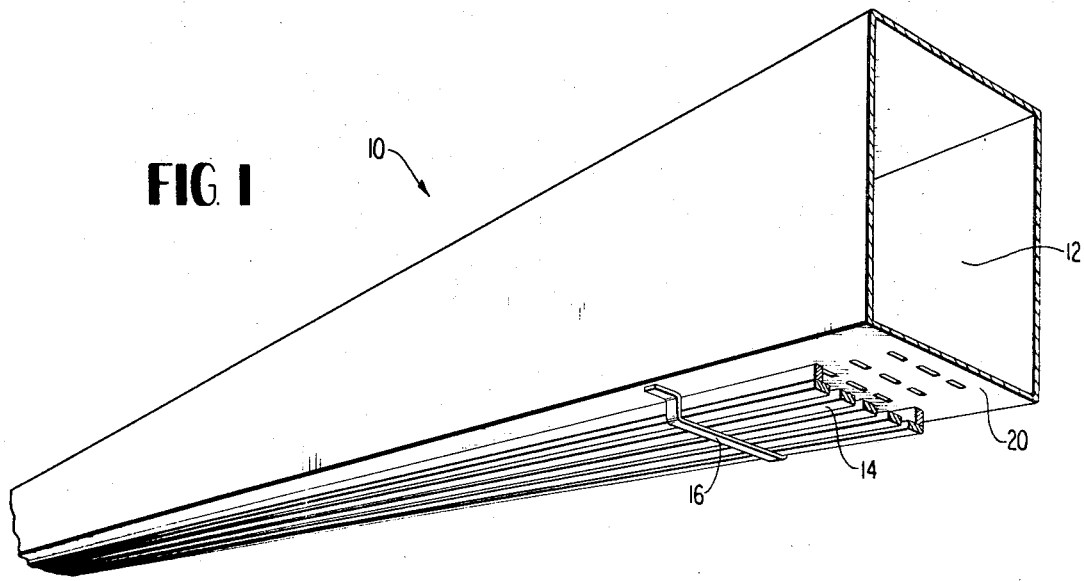
FIG. 1 is a fragmentary perspective view of an air conveyor constructed in accordance with the present invention.
Figure 2:
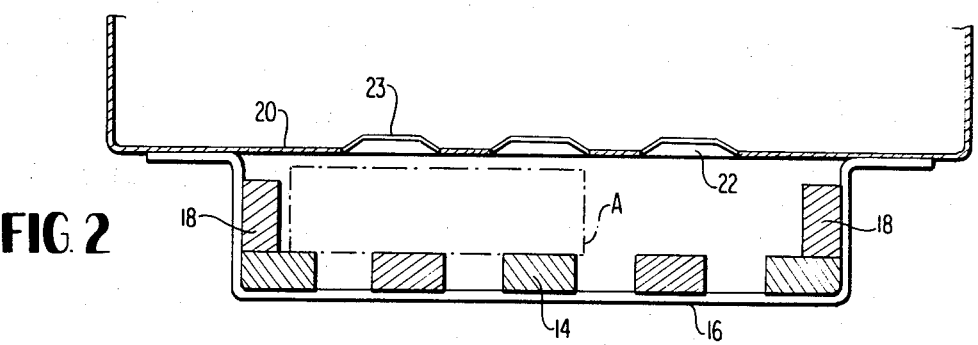
FIG. 2 is an enlarged fragmentary cross sectional view thereof.
Figure 3:
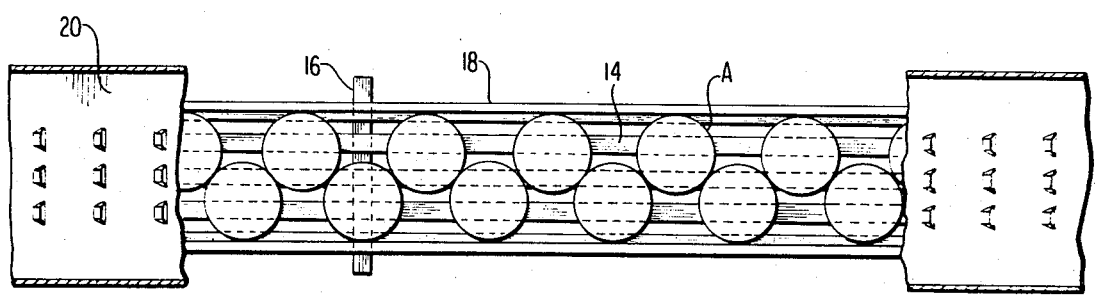
FIG. 3 is a fragmentary longitudinal cross sectional view thereof with parts broken away to illustrate accumulated articles on the conveyor.

Referring now to the drawings, particularly to FIG. 1, there is illustrated a section of a conveyor, generally indicated 10, and including a plenum 12 in communication with a source of air under pressure, not shown. A plurality of elongated guide rails 14 are spaced laterally one from the other along one side of plenum 12 and secured in spaced relation thereto by a plurality of longitudinally spaced brackets 16 suitably fixed to plenum 12. A pair of elongated side rails 18 are also provided and fixed to the brackets 16. It will be appreciated that the rails 14 and 18 define a substantially channel-shaped guide in which articles, such as illustrated by the dot-dash lines in FIG. 2 and indicated A in FIGS. 2 and 3, are disposed. The articles A are thus confined within the channel-shaped guide by rails 14 and 18 and an elongated plate 20, which forms a side of plenum 12.

Plate 20 has a plurality of slots 22 formed therethrough for communicating air from plenum 12 into the channel-shaped guide for the purpose of propelling articles A along the conveyor guide. Particularly, slots 22 are arranged in a plurality of transversely spaced longitudinally extending rows. Each slot 22 is comprised of an incision formed in plate 20 and a portion 23 depressed from the plane of plate 20 downstream from the incision. Depressed portion 23 thus forms a baffle for directing air from plenum 12 through slots 22 for issuance into the channel-shaped guide as air jets having flow components predominantly in the direction of movement of the articles along the conveyor. That is to say, the air jets issuing through slots 22 from plenum 12 have flow components predominantly parallel to plate 20 for the purpose of propelling the articles along the channel-shaped guide. In the particular conveyor herein illustrated, articles A rest on the lower guide rails 14 and the air jets issuing through plate 20 impinge against the upper surface of the articles and along their rear edges to propel the articles along the channel-shaped guide. It will be appreciated that, while the invention is herein illustrated with the articles resting on the base of the channel-shaped guide, the guide and plenum may be oriented in any direction whereby conveyance of the articles may be provided in any desired direction. For example, the guide and plenum may be oriented with the plate 20 facing downwardly (as illustrated), upwardly, or sideways, and if desired, the guide and plenum may be positioned in the horizontal, vertical, or at an incline for any given orientation of the face plate.

In accordance with the present invention, the lateral rails 18 are spaced one from the other in relation to the width of the articles conveyed. Specifically, to achieve the rapid accumulation recovery rates afforded by the present invention, lateral rails 18 are particularly spaced one from the other a distance greater than the width of the articles conveyed and less than a whole multiple of the width of the articles greater than one. By forming the conveyor in the foregoing manner, the articles, when accumulated along the conveyor, will be randomly laterally offset one from the other whereby the propelling force of the air jets issuing through slots 22 acts not only against the surfaces of the articles parallel slotted plate 20, but also against substantially the entirety of the rear edges of the accumulated articles whereby substantially the entirety of the propelling force of the air jets normally applied to the articles to convey them along the conveyor is also applied to the articles when accumulated. In this manner, the articles rapidly recover from accumulation and very quickly obtain the normal velocity at which they are conveyed.

The present invention has been found particularly useful for conveying circular or disc-like articles, for example, jar lids. In constructing a conveyor in accordance with the present invention for use with conveying circular objects, the lateral guide rails 18 are spaced one from the other a distance greater than the diameter of the circular objects and less than a whole multiple of the diameter of the articles greater than 1. In this manner, the circular articles will accumulate in the manner illustrated in FIG. 3 in staggered rows extending in the direction of movement, with the articles in each row spaced one from the other. Thus, the propelling forces of the air jets issuing through the directional slots 22 act not only against the flat surfaces of the circular objects parallel plate 20, but also against their rear edges, whereby substantially the entirety of the normal propelling force is applied to the articles when accumulated and hence their rapid recovery from accumulation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An air conveyor apparatus combined with articles having a predetermined width which articles are subject to alternate periods of movement and accumulation, said apparatus comprising:

means defining a selected path of movement for the articles including means for constraining the articles for movement along said selected path, means for propelling the articles along said parth including a member having a plurality of slots and a source of air under pressure in communication with said slots, said slots being configured to direct air jets having flow components predominantly in said direction of movement against the articles to impart a propelling force thereto, said constraining means having a width in the region of a small integer number of widths plus one-half width of said articles so that when accumulated along said conveying apparatus, the articles are thus arranged in staggered rows in the direction of conveyance to expose substantially the entirety of the rear edges of said articles, said slot means positioned to discharge the air directly on said rear edges of said articles.

2. The apparatus according to claim 1 wherein said constraining means includes a pair of laterally spaced rails and a surface disposed between said rails forming a generally channel-shaped guide for the articles, said member being spaced from said surface adjacent the open side of said channel-shaped guide whereby said rails, said surface and said member define an enclosure in which the articles are conveyed.

3. The apparatus according to claim 2 wherein said surface is adapted to support the articles for movement therealong, the member being spaced from the articles.

4. The apparatus according to claim 1 wherein the articles conveyed are circular, said constraining means having a width less than twice the predetermined width of the articles whereby the accumulated articles are adapted for arrangement in a pair of staggered rows extending in the direction of movement of the articles with the articles in each row being spaced one from the other.

* * * * *